(12) United States Patent
Grupp et al.

(10) Patent No.: US 6,449,028 B1
(45) Date of Patent: Sep. 10, 2002

(54) LIQUID CRYSTAL DISPLAY DEVICE HAVING SEALING FRAME AND/OR SPACERS FORMED OF ANISOTROPIC POLYMER USED TO ALIGN THE LIQUID CRYSTAL MOLECULES

(75) Inventors: Joachim Grupp; Nicolas Blanckaert, both of Neuchâtel; Manuel Bouvier, Lausanne, all of (CH)

(73) Assignee: Asulab S.A., Bienne (CH)

( * ) Notice: Subject to any disclaimer, the term of this patent is extended or adjusted under 35 U.S.C. 154(b) by 0 days.

(21) Appl. No.: 09/328,595

(22) Filed: Jun. 10, 1999

(30) Foreign Application Priority Data

Jun. 12, 1998 (CH) ................................................ 1279/98

(51) Int. Cl.⁷ ........................ G02F 1/1337; G02F 1/1339
(52) U.S. Cl. ........................ 349/191; 349/127; 349/153; 349/156
(58) Field of Search .................. 349/153, 156, 349/127, 123, 155, 133, 135, 191, 157

(56) References Cited

U.S. PATENT DOCUMENTS

| 4,653,864 | A |   | 3/1987  | Baron et al. |
|-----------|---|---|---------|--------------|
| 4,763,995 | A |   | 8/1988  | Katagiri et al. |
| 5,464,669 | A |   | 11/1995 | Kang et al. |
| 5,576,856 | A | * | 11/1996 | Kawazu et al. ............... 359/51 |
| 5,705,096 | A |   | 1/1998  | Kano et al. |
| 5,784,137 | A | * | 7/1998  | Shiomi et al. ............... 349/88 |
| 5,818,558 | A | * | 10/1998 | Ogishima ................. 349/110 |
| 5,956,112 | A | * | 9/1999  | Fujimori et al. ........... 349/156 |
| 6,025,895 | A | * | 2/2000  | Yazaki et al. .............. 349/86 |
| 6,097,458 | A | * | 8/2000  | Tsuda et al. ............... 349/113 |

FOREIGN PATENT DOCUMENTS

| EP | 772 071   | 5/1997 |
| GB | 2 307 057 | 5/1997 |

OTHER PUBLICATIONS

"Photosensitive Orientants for Liquid Crystal Alignment", T. Ya. Marusii and Yu A. Reznikov; vol. 3, No. 2, 1993, pp. 161–168.

"Polarized UV–Exposed Polyimide Films for Liquid–Crystal Alignment", J.L. West, X. Wang, Y. Ji, J. R. Kelly, vol. 26, May 1995, pp. 703–705.

* cited by examiner

Primary Examiner—Kenneth Parker
Assistant Examiner—Andrew Schechter
(74) Attorney, Agent, or Firm—Sughrue Mion, PLLC

(57) ABSTRACT

The invention concerns a liquid crystal display cell including two close substrates (2), separated by a sealing frame which delimits a sealed enclosure in which the liquid crystal molecules (4) are confined, and spacers (8) intended to maintain a constant spacing between said substrates (2), characterised in that the sealing frame and/or the spacers (8) are formed of an anisotropic polymer which is used to align and orient the liquid crystal molecules.

4 Claims, 1 Drawing Sheet

LIQUID CRYSTAL DISPLAY DEVICE HAVING SEALING FRAME AND/OR SPACERS FORMED OF ANISOTROPIC POLYMER USED TO ALIGN THE LIQUID CRYSTAL MOLECULES

BACKGROUND OF THE INVENTION

The present invention concerns a liquid crystal electro-optical display device including spacers and a method for manufacturing such a device.

The invention concerns the industrial sector of manufacturing liquid crystal visual display devices, formed of two close plates or substrates made of glass, quartz, silicon or other material, between which is formed a sealed enclosure in which liquid crystals are confined.

These liquid crystal display devices include in particular so-called alignment layers deposited on the opposing faces of the two substrates, and which are used to align and orient the liquid crystal molecules. The conditioning of the surface of these alignment layers is very important, since the orientation of the molecules and, consequently, the display contrast, depends upon it.

A first known technique for forming the alignment layers consists in depositing alignment materials such as $SiO_2$, $MgF_2$, $WO_3$, $MoO_3$ or others along a determined angle of incidence over the surface of the substrates. In order to deposit these alignment materials over the surface of the substrates along the desired angle of incidence, a vaporising source is deposited with the inclination selected with respect to a straight line perpendicular to the surface of the substrates. Among suitable deposition methods, one may cite vacuum deposition, the atomisation method and other known vapour phase deposition methods.

Another known technique for forming the alignment layers consists in applying, for example by centrifuging, an alignment material such as polyimide solution, to the surface of the substrates. Non polymerised polyimide solution remains non polymerised after evaporation by drying the solvent. In a subsequent manufacturing step, the liquid crystal display cell is heated, for example for one hour at approximately 250° C., which causes polymerisation of the polyimide alignment layers. After polymerisation, the alignment layers are rubbed.

Liquid crystal display cells of the type described above also include spacers intended to maintain a constant distance or separation between the two plates of the cells and to give the cells satisfactory mechanical rigidity. In methods known to date, maintenance of the distance between the two plates is generally assured by balls or discontinuous fibres of perfectly controlled geometrical dimensions, distributed over one of the plates and bonded before the second plate is set in place. Since this initial technique has certain drawbacks, such as, in particular, that imprecise positioning of the balls can lead, locally, to mechanical deformation of the cells, replacing these balls with continuous spacers, formed of wires or bars of square, circular, polygonal or other cross-section has been proposed. These wires or bars, for example made of glass or quartz, are fixed by adhesion, bonding or sealing either onto only one of the two plates, their height being equal to the desired spacing, or on each of the plates so as to criss-cross, the series of spacers assuring the spacing between the plates and giving the resulting cell the desired mechanical rigidity.

These spacers, whether they are balls, cut fibres, continuous bars or others, have nonetheless the drawback of disturbing the alignment of the liquid crystal molecules, which prevents the polarisation rotation. Different problems then arise the most noteworthy of which are as follows:

formation of disturbed zones causing a reduction in contrast, or generating the <<reverse rotation>> phenomenon which affects the uniformity of the display;

loss of alignment after a long period of operation;

formation of halos around activated segments resulting from a too low a rotation angle of the liquid crystal molecules.

In order to overcome these problems, Japanese Patent No. 10003082 proposes making spacer balls in the form of fine particles of plastic material obtained via polymerisation of a fluorite type monomer emulsion, known for its liquid crystal molecule alignment properties. However, the polymer balls resulting from this method have an amorphous structure, so that the liquid crystal molecules tend to align themselves radially around the balls. Thus, even if, in proximity to these balls, the alignment of the liquid crystal molecules is more ordered, this alignment nonetheless still differs substantially from the homogenous or homeotropic planar alignment of the liquid crystal in the rest of the volume of the display cell. Even at one degree less, the problems of reduction in contrast and non uniformity therefore subsist.

BRIEF SUMMARY OF THE INVENTION

The object of the present invention is thus to overcome the above drawbacks and others by providing spacers which do not disturb the alignment of the liquid crystal molecules.

The invention therefore concerns a liquid crystal display cell including two close substrates, separated by a sealing frame which delimits a sealed enclosure in which the liquid crystals are confined, and spacers intended to maintain a constant spacing between said substrates, this cell being characterised in that the sealing frame and/or the spacers are formed of an anisotropic polymer which is used to align and orient the liquid crystal molecules.

As a result of this feature, the principal axes of the polymer molecules are aligned along a privileged direction, such alignment being transferred by surface effect to the liquid crystal molecules. The liquid crystal molecules, in turn, will, as a function of the orientation of the polymer molecules, be aligned in a homogenous or homeotropic planar manner at right angles to the spacers, in the same way as in the rest of the display cell volume. The invention thus allows the phenomena of alignment disturbance of the liquid crystal molecules which usually occurs in proximity to conventional spacers or sealing frames to be avoided. A more reliable display is thus obtained, with better contrast and without halos or parasite display points.

The present invention also concerns a method for manufacturing a display cell of the aforementioned type, characterised in that it includes the steps of:

coating a substrate with a monomer layer, depositing on the monomer layer a mask having openings whose contour corresponds to the shape of the desired sealing frame or spacers, irradiating the monomer layer through the mask openings by means of a polarised beam, and removing the mask and the non exposed monomer.

BRIEF DESCRIPTION OF THE DRAWINGS

Other features and advantages of the present invention will appear more clearly upon reading the detailed description which follows of an implementation of the method according to the invention, this example being given purely by way of illustrative and non limiting example, in conjunction with the annexed drawings, in which.

DETAILED DESCRIPTION OF THE DRAWINGS

The present invention proceeds from the general inventive idea which consists in making liquid crystal display cell spacers of a material facilitating the alignment of the liquid crystal molecules in proximity to such spacers.

The present invention will be described with reference to the spacers conventionally used for maintaining a constant space between the two substrates of a liquid crystal display cell and giving the latter sufficient mechanical rigidity. In the case of continuous spacers in the shape of bars, these can also be used for assuring the confinement and separation of liquid crystals of different types while forming walls which delimit the filling channels for said liquid crystals in for example a polychromatic display cell. Finally, the inventive concept can be similarly extended to the sealing frame of display cells, allowing a larger useful display surface to be obtained.

Figure 1:
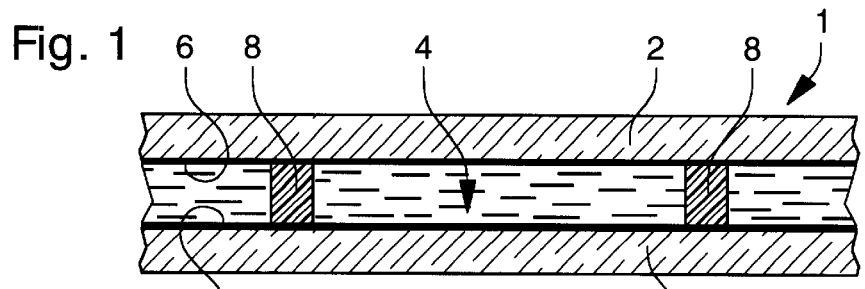
FIGS. 1 to 3 are partial schematic views of a display cell according to the invention.
Figure 2:
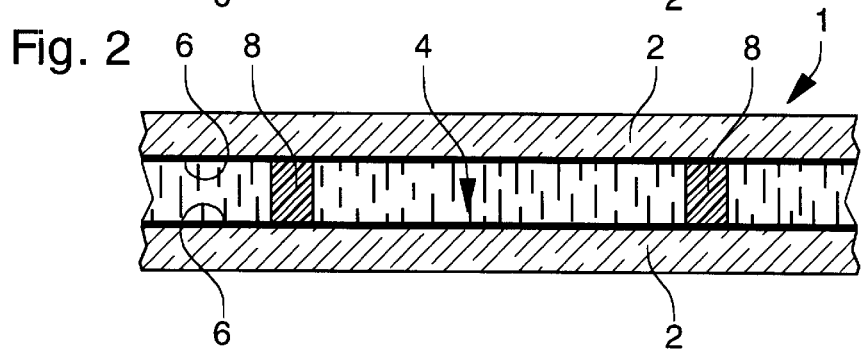
Figure 3:
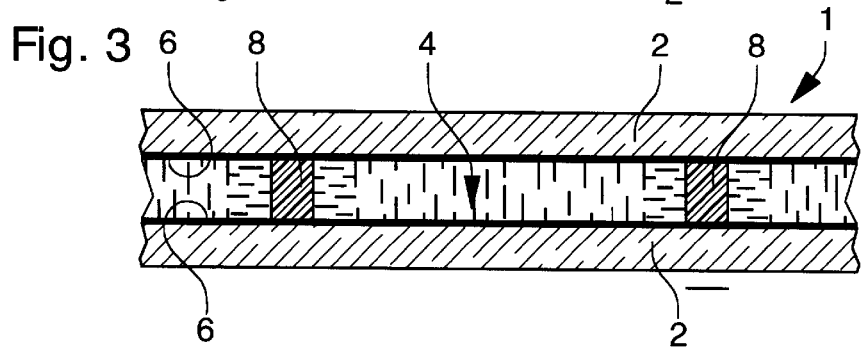

FIGS. 1 to 3 are partial schematic views of a display cell designated as a whole by the general numerical reference 1. This cell includes, in a conventional manner, two close plates or substrates 2 made of glass, quartz, silicon or other material, between which is formed a sealed enclosure in which the liquid crystal molecules 4 are confined. The principal axes of liquid crystal molecules 4 are represented in the Figures by dotted lines. Alignment layers 6 are deposited on opposing faces of the two substrates 2. They are used to align and orient liquid crystal molecules 4. In the example shown in FIG. 1, liquid crystal molecules 4 are aligned in a homogenous planar way, i.e. their principal axes extend along a privileged direction parallel to the surface of alignment layers 6. In the examples shown in FIGS. 2 and 3, liquid crystal molecules 4 are aligned in a homeotropic way, i.e. their principal axes extend along a privileged direction perpendicular to the surface of alignment layers 6.

Substrates 2 are maintained spaced apart in a conventional manner, at a constant distance from each other, by means of spacers 8. These spacers 8 are formed of wires or bars of square, circular, polygonal or other cross-section.

According to the invention, spacers 8 are made of an anisotropic polymeric material, which is used to align and orient liquid crystals 4. When liquid crystal 4 is of the smectic type, the polymer will be selected from the group formed in particular by the polyamides (see, for example, the article entitled <<Polarised UV-exposed polyimide films for liquid crystal alignment >> which appeared in SID 95 Digest, pp. 703–705) and certain diacrylates such as phenylene (p-alkyloxyacrylate) benzoate. When liquid crystal 4 is of the nematic or cholesteric type, the polymer will be selected from the group formed in particular by the coumarins and polyvinyl cinnamates (see, for example, the article entitled <<Photosensitive orientants for liquid crystal alignment >> which appeared in Mol. Mat., 1993, Vol. 3, pp. 161–168). It goes without saying that other polymers which polymerise to the anisotropic state can be used within the scope of the present invention. Certain liquid crystals which polymerise anisotropically and become solid can also be selected. The anisotropic polymer can also be a lateral (side) chain liquid crystal polymer.

In FIG. 1 it can be seen that liquid crystal molecules 4 are aligned, in proximity to spacers 8, in a homogenous planar manner with respect to alignment layers 6, as in the rest of the volume of display cell 1. Likewise, in FIG. 2, liquid crystal molecules 4 are aligned, in proximity to spacers 8, in a homeotropic planar manner with respect to alignment layers 6, as in the rest of the volume of display cell 1. Finally, FIG. 3 shows a mixed situation in which liquid crystal molecules 4 are aligned, in proximity to spacers 8, in a homogenous planar manner with respect to alignment layers 6, while these same molecules are aligned in a homeotropic manner with respect to alignment layers 6 in the rest of the volume of display cell 1. The case in which certain spacers 8 of a display cell 1 facilitate planar alignment of liquid crystal molecules 4, while other spacers 8 induce homeotropic alignment of these same molecules, can also be envisaged.

According to the essential advantage of the invention, the polymer molecules of spacers 8 polymerise along an anisotropic macroscopic structure ordered at long distance. The principal axes of these polymer molecules are thus aligned during polymerisation along a well defined privileged direction, which will induce homogenous planar or homeotropic alignment of liquid crystal molecules 4 via a surface effect well known to those skilled in the art. It is thus possible to control very accurately the alignment of liquid crystal molecules 4, which allows a better contrast to be obtained for the display, and facilitates electric switching of liquid crystals 4. These results prove particularly advantageous, in particular for cholesteric or ferroelectric type liquid crystals, whose performance is advantageous for a large number of applications, but whose bistable state is extremely sensitive to alignment defaults. The invention is also very advantageous for miniaturised display devices, for example diffractive projection devices, whose tolerance is very low as regards disturbances facing the spacers.

The mixed configurations described above allow in particular uniform commutation. Indeed, in the case of nematic liquid crystals with negative dielectric anisotropy, the homogenous planar alignment of liquid crystal molecules 4 in proximity to spacers 8 according to the invention causes a wave of rotation of said molecules in the plane of the Figure when an electric field is applied. Conversely, in the prior art, uniform rotation of the liquid crystal molecules is very difficult to achieve, and requires the implementation of expensive techniques.

Likewise, the present invention facilitates relaxation of the orientation faults caused by electric switches. In the case of ferroelectric liquid crystals, frequent electric switching can cause alignment faults which are often irreversible. A uniform and gradual transition of orientation of liquid crystal molecules 4 in proximity to spacers 8 causes reversible relaxation of these faults, and allows the non deteriorated optical properties to be preserved.

Figure 4:
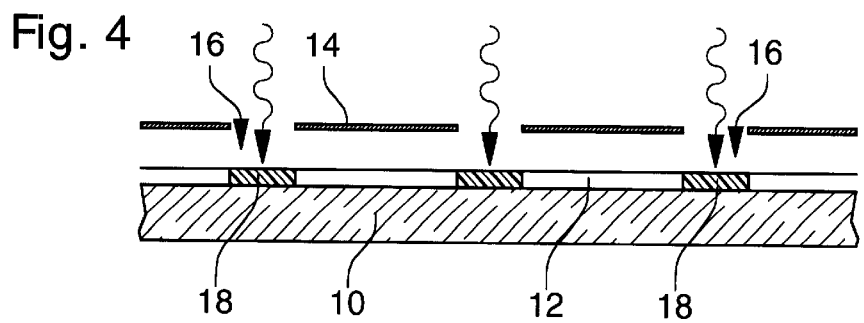
FIGS. 4 and 5 are schematic views illustrating two implementations of the method according to the invention.

A first manufacturing method for spacers 8 according to the invention is described with reference to FIG. 4. It is a photolithographical method in which substrate 10 is coated with a monomer layer 12 over which a photolithographic mask 14 is deposited. This mask 14 has openings 16 whose contour corresponds to the shape of spacers 18 which one wishes to obtain. Monomer layer 12 is then irradiated through openings 16 of mask 14, for example by means of a polarised ultraviolet beam. The exposed surfaces of monomer layer 12 polymerise to the anisotropic state by the effect of the incident radiation. It will be understood that the orientation of the polymer molecules depends on the polarisation of the incident radiation, and that this latter can be modified by modifying the polarisation of said radiation. Finally, photolithographical mask 14 is removed, and the non exposed monomer is removed by means of a suitable solvent.

Figure 5:
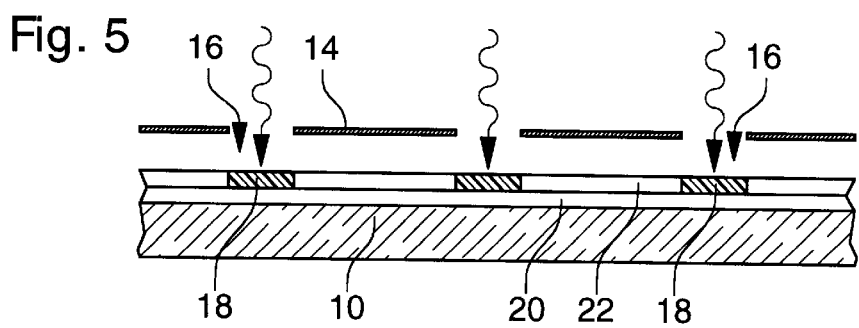

Another manufacturing method for spacers 8 according to the invention is described with reference to FIG. 5. It is also a photolithographical method in which substrate 10 is coated with a conventional alignment layer 20, for example a rubbed polyimide layer. A layer 22 of a mesogenic liquid crystal monomer is then deposited on this alignment layer 20, then photolithographical mask 14. There is a transfer of alignment from alignment layer 20 to monomer layer 22. This layer 22 is then irradiated through openings 16 of photolithographical mask 14, for example by means of a non polarised ultraviolet beam. The exposed surfaces of mesogenic monomer layer 22 polymerise anisotropically, and become solid. Finally, the non exposed monomer is removed by means of a suitable solvent.

It goes without saying that various simple modifications and variants fall within the scope of the present invention.

What is claimed is:

1. A liquid crystal display cell including two close substrates, separated by a sealing frame which delimits a sealed enclosure in which the liquid crystal molecules are confined, and spacers intended to maintain a constant spacing between said substrates, wherein the sealing frame and/or the spacers are formed of an anisotropic polymer which is used to align and orient the liquid crystal molecules, wherein the polymer is obtained via polymerisation of a liquid crystal mesogenic monomer.

2. The display cell according to claim 1, wherein the spacers are in the shape of a wire or a bar.

3. A liquid crystal display cell including two close substrates, separated by a scaling frame which delimits a sealed enclosure in which the liquid crystal molecules are confined, and spacers intended to maintain a constant spacing between said substrates, wherein the sealing frame and/or the spacers are fonned of an anisotropic polymer which is used to align and orient the liquid crystal molecules, wherein the anisotropic polymer is a side chain liquid crystal polymer.

4. The display cell according to claim 3, wherein the spacers are in the shape of a wire or a bar.

* * * * *